(12) United States Patent
Kashiwagi et al.

(10) Patent No.: US 12,025,726 B2
(45) Date of Patent: Jul. 2, 2024

(54) ANTENNA APPARATUS, MOVABLE BODY, AND TARGET DETERMINATION METHOD

(71) Applicant: Murata Manufacturing Co., Ltd., Kyoto (JP)

(72) Inventors: Katsuhisa Kashiwagi, Kyoto (JP); Nobuya Arakawa, Kyoto (JP); Hideaki Yamada, Kyoto (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 519 days.

(21) Appl. No.: 17/245,317

(22) Filed: Apr. 30, 2021

(65) Prior Publication Data

US 2021/0247486 A1 Aug. 12, 2021

Related U.S. Application Data

(63) Continuation of application No. PCT/JP2019/042016, filed on Oct. 25, 2019.

(30) Foreign Application Priority Data

Nov. 2, 2018 (JP) ................................. 2018-207213

(51) Int. Cl.
  *F01D 25/20* (2006.01)
  *F01D 25/18* (2006.01)
  (Continued)

(52) U.S. Cl.
  CPC ................ *G01S 7/03* (2013.01); *G01S 7/411* (2013.01); *H01Q 1/42* (2013.01); *H01Q 9/0407* (2013.01); *H01Q 21/08* (2013.01); *G01S 7/356* (2021.05)

(58) Field of Classification Search
  None
  See application file for complete search history.

(56) References Cited

U.S. PATENT DOCUMENTS 4,180,817 A    12/1979 Sanford
5,045,856 A *   9/1991 Paoletti ................. G01S 13/931
                                                     342/146

(Continued)

FOREIGN PATENT DOCUMENTS

JP    S57-154908 A    9/1982
JP    H11-004118 A    1/1999

(Continued)

OTHER PUBLICATIONS

International Search Report for International Application No. PCT/JP2019/042016 dated Jan. 28, 2020.

(Continued)

*Primary Examiner* — Bernarr E Gregory
(74) *Attorney, Agent, or Firm* — Pearne & Gordon LLP

(57) ABSTRACT

An antenna apparatus includes multiple antenna elements each performing at least one of transmission and reception of radio waves. The coverage areas of main lobes of radiation patterns of the multiple antenna elements are overlapped with each other and the shapes of side lobes thereof are varied among the multiple antenna elements. With this configuration, it is possible to discriminate and acquire the signal of the radio waves coming from the coverage areas of the main lobes of the antenna from the signal of the radio waves coming from the outside of the coverage areas.

11 Claims, 10 Drawing Sheets

(51) Int. Cl.
*F01M 5/00* (2006.01)
*F02C 7/06* (2006.01)
*F02C 7/14* (2006.01)
*F02K 9/64* (2006.01)
*G01S 7/03* (2006.01)
*G01S 7/41* (2006.01)
*H01Q 1/42* (2006.01)
*H01Q 9/04* (2006.01)
*H01Q 21/08* (2006.01)
*G01S 7/35* (2006.01)

(56) References Cited

U.S. PATENT DOCUMENTS

| | | | | |
|---|---|---|---|---|
| 5,369,409 | A | * 11/1994 | Urabe | G01S 13/931 |
| | | | | 342/128 |
| 5,945,939 | A | * 8/1999 | Iihoshi | G01S 13/34 |
| | | | | 342/112 |
| 5,955,752 | A | 9/1999 | Fukaya et al. | |
| 6,031,483 | A | * 2/2000 | Urabe | G01S 13/345 |
| | | | | 342/128 |
| 6,414,628 | B1 | * 7/2002 | Ashihara | G01S 13/931 |
| | | | | 342/115 |
| 2003/0076275 | A1 | 4/2003 | Takimoto et al. | |
| 2004/0227663 | A1 | 11/2004 | Suzuki et al. | |
| 2007/0001897 | A1 | * 1/2007 | Alland | H01Q 21/0006 |
| | | | | 342/158 |
| 2007/0194986 | A1 | * 8/2007 | Dulmovits, Jr. | H01Q 21/20 |
| | | | | 342/371 |
| 2016/0131742 | A1 | * 5/2016 | Schoor | G01S 13/931 |
| | | | | 342/128 |
| 2016/0344095 | A1 | 11/2016 | Tagi | |
| 2018/0132391 | A1 | 5/2018 | Hyun et al. | |

FOREIGN PATENT DOCUMENTS

| | | |
|---|---|---|
| JP | 2003-133851 A | 5/2003 |
| JP | 2004-312696 A | 11/2004 |
| JP | 2010-093399 A | 4/2010 |
| JP | 2010-133907 A | 6/2010 |
| JP | 2012-159327 A | 8/2012 |
| JP | 2013-210243 A | 10/2013 |
| JP | 2015-068724 A | 4/2015 |
| JP | 2015-216530 A | 12/2015 |
| JP | 2016-219996 A | 12/2016 |
| JP | 2017-207425 A | 11/2017 |

OTHER PUBLICATIONS

Written Opinion for International Application No. PCT/JP2019/042016 dated Jan. 28, 2020.

* cited by examiner

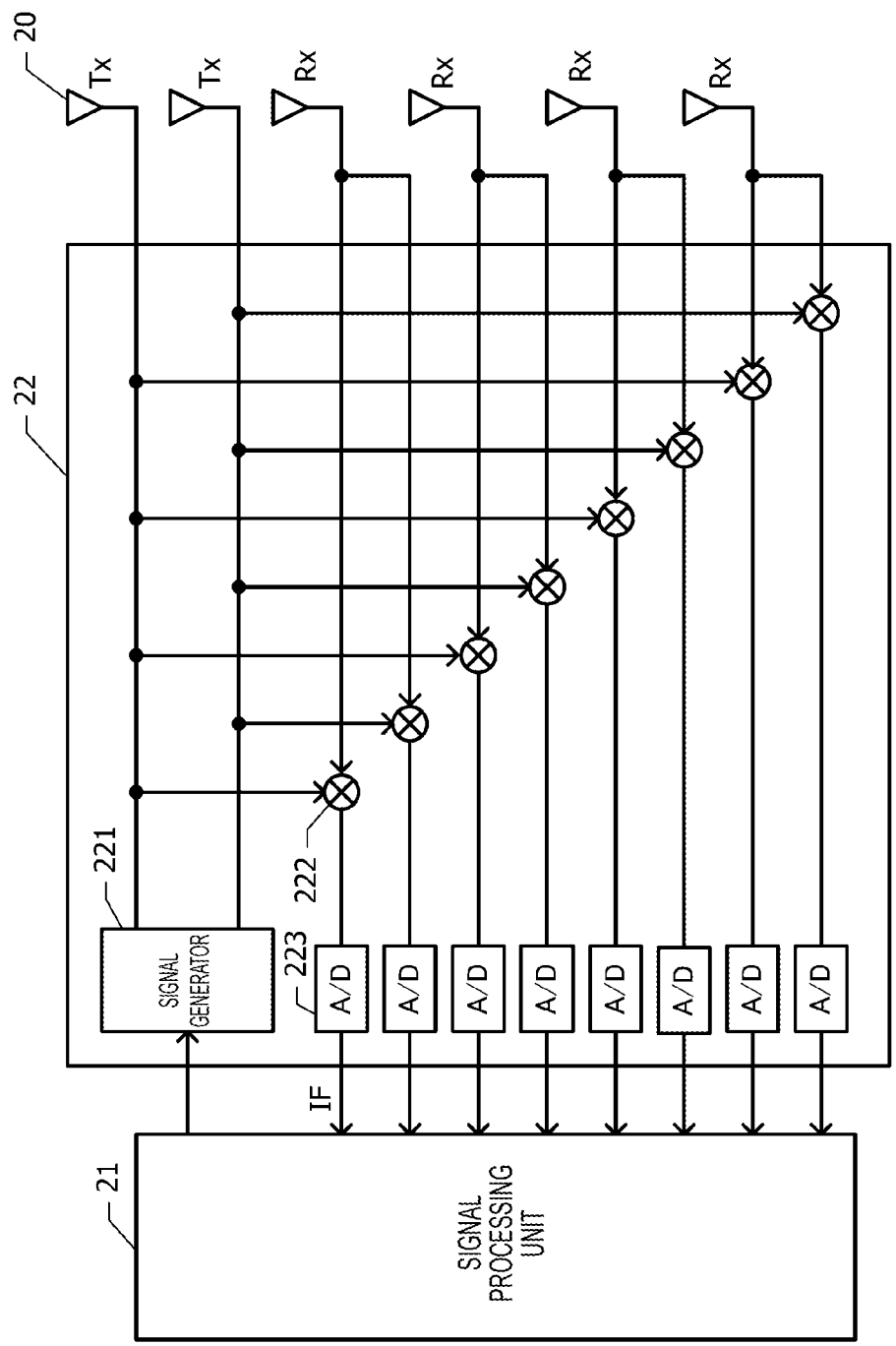

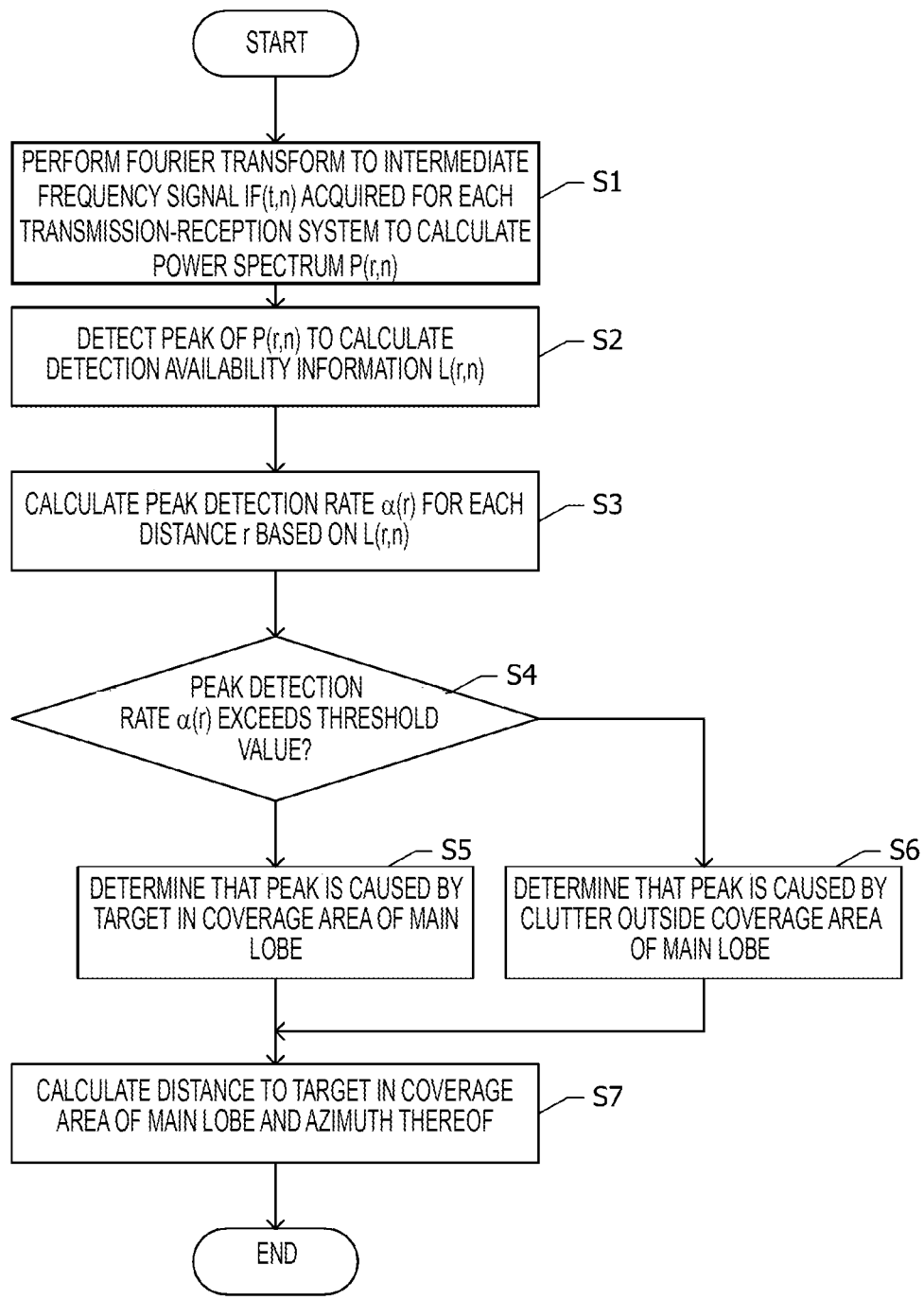

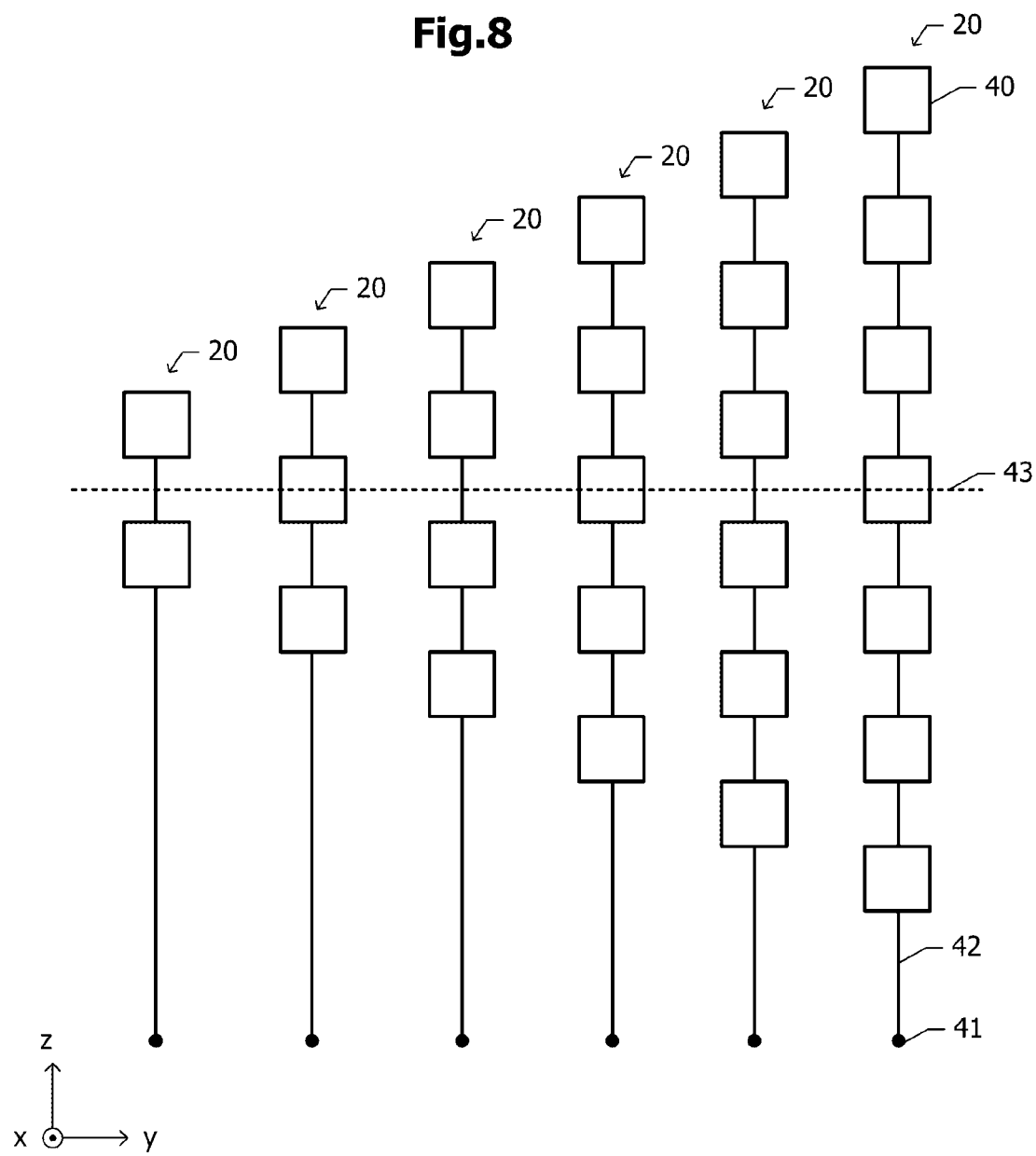

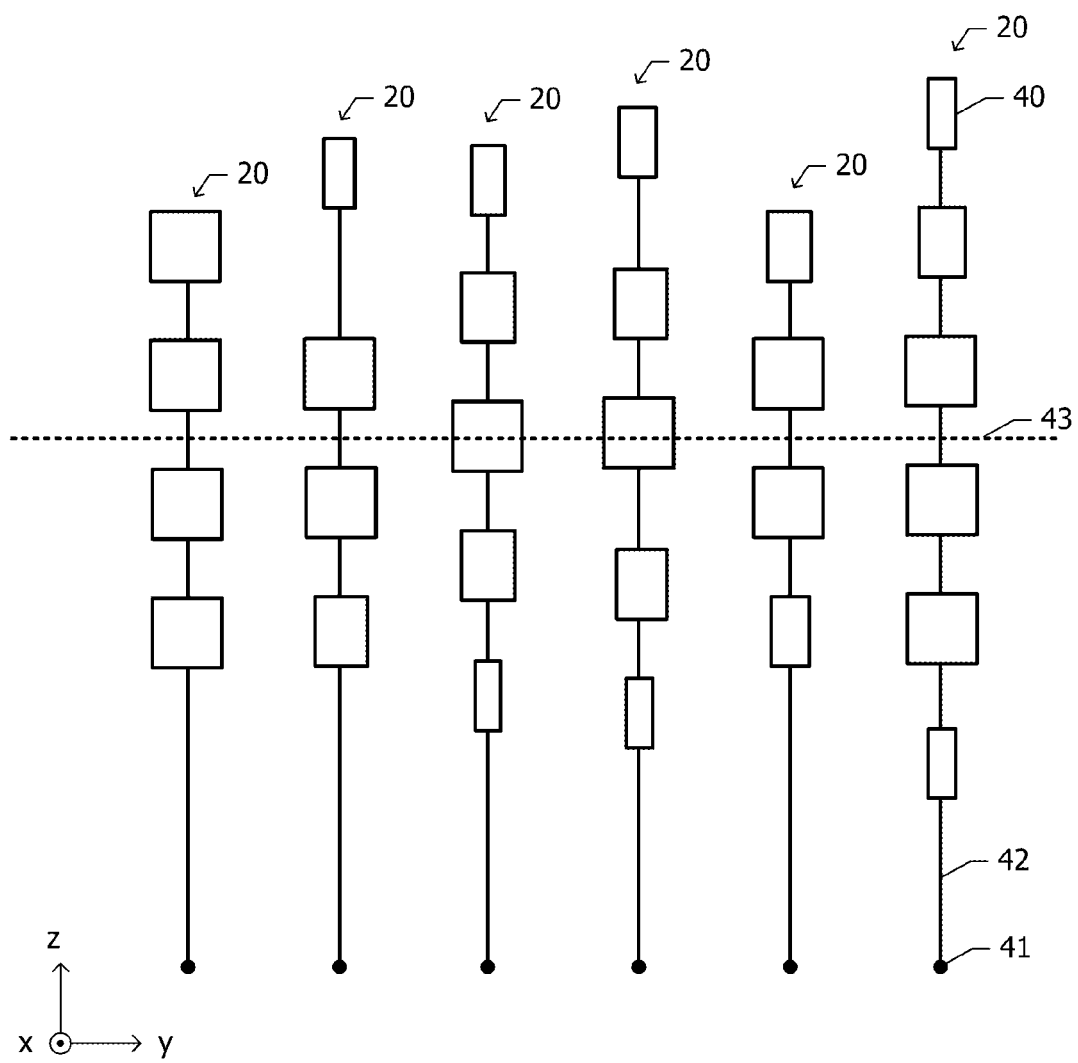

ANTENNA APPARATUS, MOVABLE BODY, AND TARGET DETERMINATION METHOD

CROSS REFERENCE TO RELATED APPLICATIONS

This is a continuation of International Application No. PCT/JP2019/042016 filed on Oct. 25, 2019 which claims priority from Japanese Patent Application No. 2018-207213 filed on Nov. 2, 2018. The contents of these applications are incorporated herein by reference in their entireties.

BACKGROUND

Technical Field

The present disclosure relates to an antenna apparatus, a movable body having the antenna apparatus loaded therein, and a target determination method.

Radar detection apparatuses are known, which use multiple systems composed of a combination of transmission and reception (for example, refer to Patent Document 1 mentioned below). The radar detection apparatus disclosed in Patent Document 1 detects a peak of the spectrum of a signal in each system to determine the peak having a small variation in the position for each system to be a peak caused by a target and determine the peak having a large variation in the position for each system to be a peak caused by clutter.

Patent Document 1: Japanese Unexamined Patent Application Publication No. 2017-207425

BRIEF SUMMARY

The orientation of the antenna is generally adjusted so that the target to be detected is arranged in the coverage area of a main lobe of the antenna. In the radar detection apparatus disclosed in Patent Document 1, when the position of the peak of the spectrum acquired based on radio waves coming from the direction corresponding to a side lobe of the antenna has a small variation, the radio waves are falsely recognized as the radio waves from the target.

In a typical wireless communication system, the orientation of a reception antenna is adjusted so that a transmission antenna is included in the coverage area of the main lobe of the reception antenna. If the radio waves with high intensity come from the direction corresponding to the side lobe of the reception antenna, it may be difficult to isolate the signal to be originally received from the signal of the radio waves from the direction corresponding to the side lobe.

The present disclosure provides an antenna apparatus capable of discriminating and acquiring the signal of the radio waves coming from the coverage area of the main lobe of the antenna from the signal of the radio waves coming from the outside of the coverage area. The present disclosure further provides a movable body having the antenna apparatus loaded therein. The present disclosure further provides a target determination method using the antenna apparatus.

According to one aspect of the present disclosure, an antenna apparatus includes multiple antenna elements each performing at least one of transmission and reception of radio waves. Coverage areas of main lobes of radiation patterns of the multiple antenna elements are overlapped with each other and shapes of side lobes thereof are varied among the multiple antenna elements.

According to another aspect of the present disclosure, a movable body includes a radar apparatus. The radar apparatus includes multiple transmission-reception systems each composed of a combination of a transmission antenna element and a reception antenna element, among multiple transmission and reception antenna elements. Coverage areas of main lobes of radiation patterns of the multiple antenna elements are overlapped with each other and shapes of side lobes thereof are varied among the multiple antenna elements. The movable body further includes a transmission-reception unit that processes radio-frequency signals that are transmitted and received by the multiple transmission-reception systems and a signal processing unit that performs Fourier transform to the signal processed in the transmission-reception unit for each of the multiple transmission-reception systems, detects peaks of a waveform resulting from the Fourier transform, extracts a peak based on reflection from a target in the coverage area of the main lobe from the detected peaks, and calculates a distance to the target in the coverage area of the main lobe based on the extracted peak.

According to another aspect of the present disclosure, a target determination method includes processing radio-frequency signals transmitted and received by multiple transmission-reception systems each composed of a combination of a transmission antenna element and a reception antenna element, among multiple transmission and reception antenna elements having coverage areas of main lobes of radiation patterns, which are overlapped with each other, and having different shapes of side lobes, to generate an intermediate frequency signal for each transmission-reception system; performing Fourier transform to the intermediate frequency signal generated for each transmission-reception system to detect peaks of a waveform resulting from the Fourier transform; and determining the peak commonly appearing in the waveform resulting from the Fourier transform for each transmission-reception system to be a peak caused by a target to be detected.

Since the coverage areas of the main lobes of the multiple antenna elements are overlapped with other, the radio waves coming from the coverage areas are capable of being received by all the antenna elements with high sensitivity. Since the shapes of the side lobes are varied among the multiple antenna elements, the antenna elements have different sensitivities for the radio waves coming from the direction corresponding to the side lobes. Accordingly, the signal of the radio waves coming from the coverage areas of the main lobes is capable of discriminating from the signal of the radio waves coming from the direction corresponding to the side lobes, that is, from the outside of the coverage areas. As a result, it is possible to reduce the error rate after demodulation using information received by the multiple antenna elements. Alternatively, it is possible to reduce the missing rate of transmission information to be transmitted from the multiple antenna elements.

The detection of the peak commonly appearing in the waveform resulting from the Fourier transform for each transmission-reception system enables the target to be detected to be determined with the influence of the clutter and so on being reduced.

BRIEF DESCRIPTION OF THE SEVERAL VIEWS OF THE DRAWINGS

FIG. 2 is a block diagram of the antenna apparatus according to the first embodiment.

FIG. 4 is a flowchart of a process performed by a signal processing unit in the antenna apparatus according to the first embodiment.

FIG. 8 is a schematic plan view of the multiple antenna elements in an antenna apparatus according to a second modification of the second embodiment.

FIG. 9 is a schematic plan view of the multiple antenna elements in an antenna apparatus according to a third modification of the second embodiment.

DETAILED DESCRIPTION

First Embodiment

An antenna apparatus according to a first embodiment and a movable body having the antenna apparatus loaded therein will now be described with reference to the drawings from FIG. 1A to FIG. 6B.

Figure 1A:
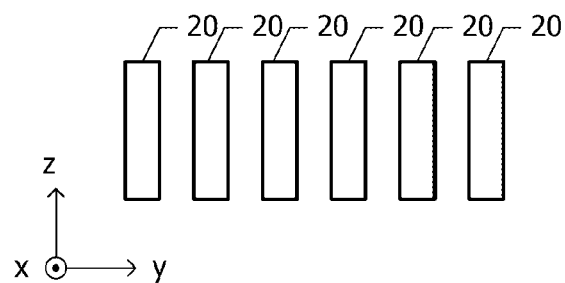
FIG. 1A is a diagram illustrating how multiple antenna elements are arranged in an antenna apparatus according to a first embodiment and FIG. 1B is a graph indicating radiation patterns of the respective antenna elements.

FIG. 1A is a diagram illustrating how multiple antenna elements 20 are arranged in the antenna apparatus according to the first embodiment. The antenna apparatus according to the first embodiment includes the multiple antenna elements 20 each performing at least one of transmission and reception. The multiple antenna elements 20 are provided on a substrate made of a dielectric material and are arrayed in a first direction. An xyz orthogonal coordinate system is defined in which the first direction in which the multiple antenna elements 20 are arrayed is the y-axis direction and the front-face direction of the antenna elements 20 is the x-axis direction. Each of the antenna elements 20 has a wide directivity in the y-axis direction. The directivity of each of the antenna elements 20 in the z-axis direction is sharper than that in the y-axis direction.

At least one of the multiple antenna elements 20 is for transmission and the remaining antenna elements 20 are for reception. In the first embodiment, the two antenna elements 20 are used for transmission and the remaining four antenna elements 20 are used for reception. Radio waves transmitted from one transmission antenna element 20 are reflected by a target and the reflected radio waves are received by the four reception antenna elements 20. A combination of one transmission antenna element 20 with one reception antenna element 20 defines one transmission-reception system. In the first embodiment, a combination of the two transmission antenna elements 20 with the four reception antenna elements 20 defines eight transmission-reception systems.

Figure 1B:
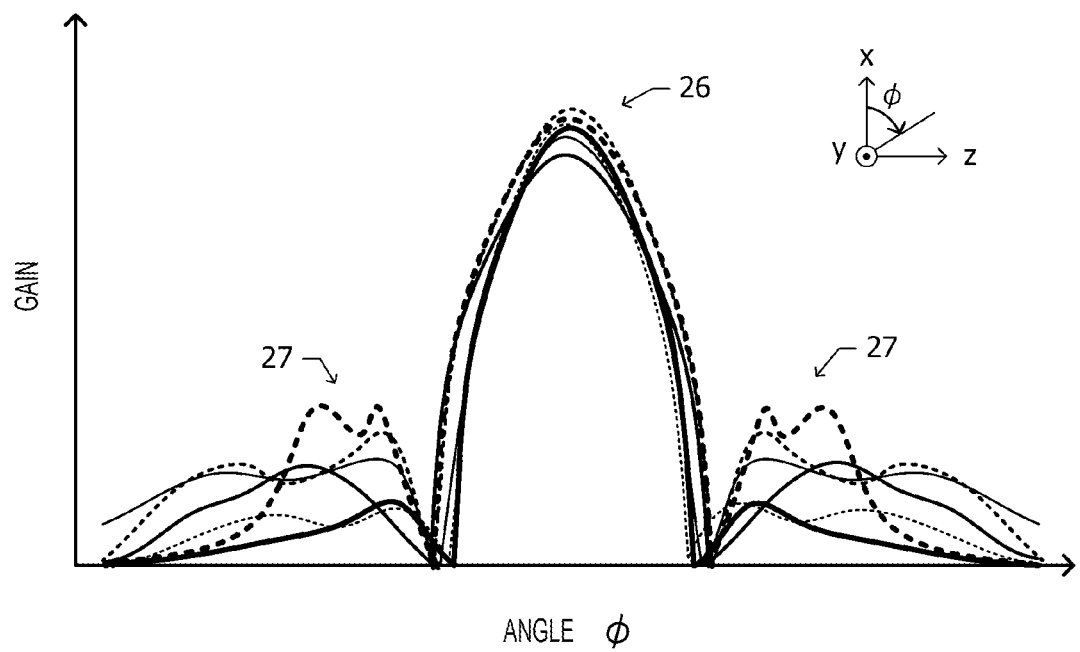

FIG. 1B is a graph indicating radiation patterns of the respective antenna elements 20 in an xz plane. The radiation patterns of the six antenna elements are indicated so as to be discriminated from each other using solid lines and broken lines and using the thicknesses of the solid lines and the broken lines in FIG. 1B. The horizontal axis represents an angle $\phi$, which is a tilt angle from the x-axis direction to the z-axis direction, and the vertical axis represents gain. Coverage areas of main lobes 26 of the multiple antenna elements 20 are overlapped with each other. The coverage areas of the main lobes 26 may be defined as, for example, areas having the gains higher than or equal to −3 dB, which is the maximum value.

The shapes of side lobes 27 of the multiple antenna elements 20 are greatly varied among the multiple antenna elements 20. Specifically, not only the magnitudes of the gains of the side lobes 27 are varied but also the side lobes 27 of the antenna elements 20 do not have similar shapes. For example, the antenna elements 20 are varied in the number of peaks of the side lobe 27, the number of null points thereof, and so on.

FIG. 2 is a block diagram of the antenna apparatus according to the first embodiment. The antenna apparatus according to the first embodiment includes the multiple antenna elements 20 illustrated in FIG. 1, a signal processing unit 21, and a transmission-reception unit 22. The transmission-reception unit 22 includes a signal generator 221, multiple mixers 222, and multiple analog-to-digital (A/D) converters 223. Among the multiple antenna elements 20, the two antenna elements 20 are transmission antenna elements Tx and the remaining four antenna elements 20 are reception antenna elements Rx.

A combination of the two transmission antenna elements Tx and the four reception antenna elements Rx defines the eight transmission-reception systems. The transmission-reception unit 22 processes radio-frequency signals that are transmitted and received for each transmission-reception system. For example, the signal generator 221 modulates carrier waves orthogonal to each other based on a modulation signal received from the signal processing unit 21 and supplies two transmission signals that are modulated to the two respective transmission antenna elements Tx. The mixers 222 and the A/D converters 223 are provided for the eight respective transmission-reception systems. The mixers 222 each mix the transmission signal and a reception signal to generate an intermediate frequency signal. The A/D converters 223 each perform A/D conversion of the intermediate frequency signal. An intermediate frequency signal IF resulting from the A/D conversion is supplied to the signal processing unit 21. A process performed by the signal processing unit 21 will be described in detail below with reference to FIG. 4.

Figure 3:
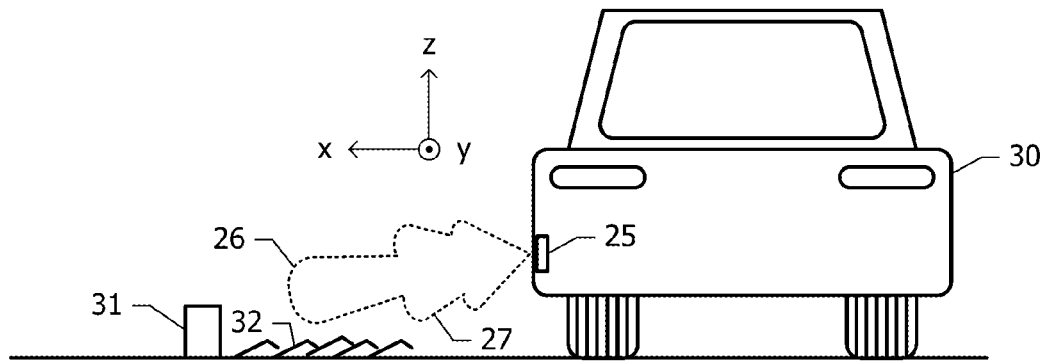
FIG. 3 is a schematic diagram illustrating a movable body in which an antenna apparatus according to the first embodiment is loaded and a target to be detected.

FIG. 3 is a schematic diagram illustrating a movable body 30 in which an antenna apparatus 25 according to the first embodiment is loaded and a target 31 to be detected. The antenna apparatus 25 is mounted on a side face of the movable body 30. The radiation pattern of one antenna element 20 (FIG. 2) of the antenna apparatus 25 is indicated using a broken line. One main lobe 26 and multiple side lobes 27 appear in the radiation pattern. The antenna apparatus 25 is fixed to the movable body 30 in an orientation in which the y-axis direction, which is the direction in which the multiple antenna elements 20 (FIG. 1) are arrayed, is leveled and the main lobe 26 of the antenna apparatus 25 is directed to the target 31 to be detected. Accordingly, the angle $\phi$ indicated in FIG. 1B is an elevation angle and the tilt angle from the x-axis direction to the y-axis direction is an azimuth angle. The antenna apparatus 25 may be mounted so that the main lobe 26 of the antenna apparatus 25 is directed to the front side or the rear side of the movable body 30.

The target 31 is, for example, a curbstone of a road. A clutter source 32 is exemplified by, for example, an irregularity on the surface of a road or a metal manhole having a high reflectance of the radio waves. The target 31 exists in the range in which the coverage areas of the main lobes 26 of the multiple antenna elements 20 (FIG. 1A) are overlapped with each other and the clutter source 32 exists outside the coverage areas of the main lobes 26. The radio waves that are radiated from the transmission antenna elements Tx (FIG. 2) and that are reflected by an object, such as the target 31, the irregularity on the surface of the road, or the manhole, which reflects the radio waves are received by the reception antenna elements Rx (FIG. 2).

FIG. 4 is a flowchart of the process performed by the signal processing unit 21 (FIG. 2).

The signal processing unit 21 performs Fourier transform to the intermediate frequency signal IF (t,n) acquired from the transmission-reception unit 22 for each transmission-reception system to calculate power spectrum P(r,n) (Step S1). Here, a variable t of the intermediate frequency signal IF (t,n) indicates that the intermediate frequency signal IF is a function of time. A variable r of the power spectrum P(r,n) indicates that the power spectrum P is a function of distance. A variable n is a system number identifying the transmission-reception system. Although the power spectrum P acquired through the Fourier transform is generally a function of frequency, the power spectrum P is represented as a function of a distance r in the first embodiment because the intermediate frequency signal IF contains beat frequency components depending on the distance.

Figure 5A:
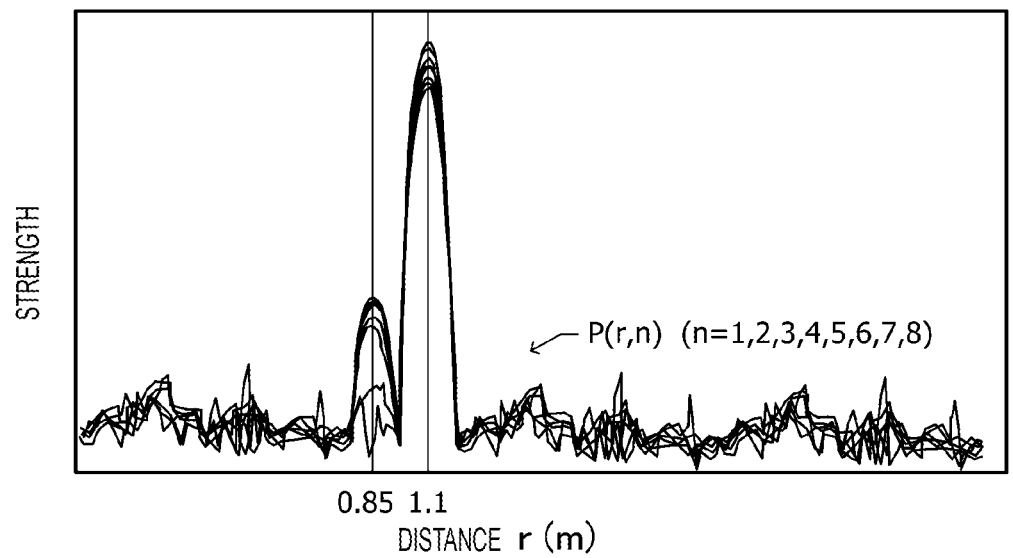
FIG. 5A is a graph indicating an example of power spectrum P(r,n)
Figure 5B:
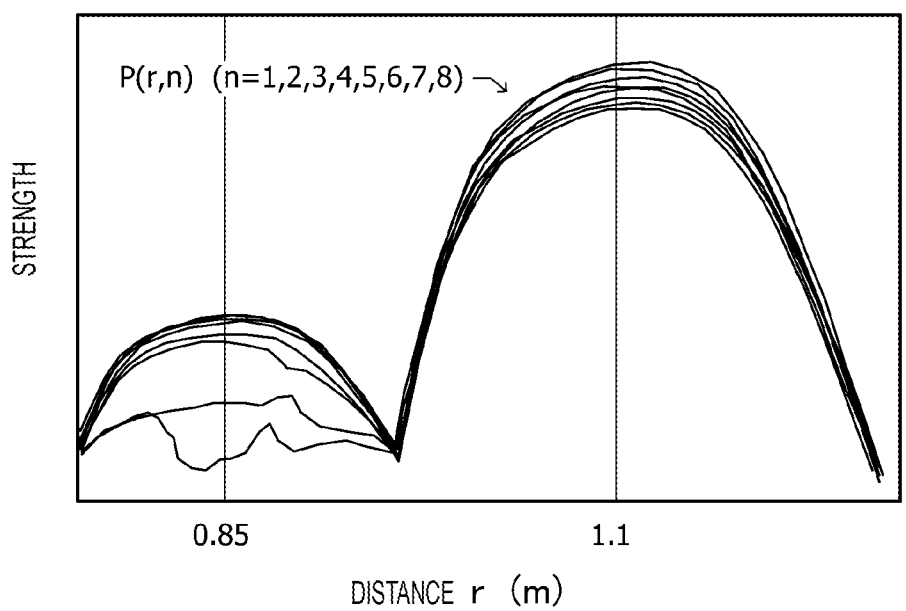
FIG. 5B is a graph resulting from enlargement of part of main lobes and side lobes in the graph illustrated in FIG. 5A.

FIG. 5A is a graph indicating an example of the power spectrum P(r,n) (n is an integer not smaller than one and not greater than eight). The horizontal axis represents the distance r in units of "m" and the vertical axis represents strength. FIG. 5B is a graph resulting from enlargement of part of the main lobes and the side lobes in the graph illustrated in FIG. 5A. In all the transmission-reception systems, large peaks appear at a position where the distance r is about 1.1 m, as indicated in FIG. 5A and FIG. 5B. In the six transmission-reception systems, relatively large peaks appear at a position where the distance is 0.85 m. In the remaining two transmission-reception systems, no peak appears at the position where the distance is 0.85 m.

After calculating the power spectrum P(r,n), the signal processing unit 21 detects the peak of the power spectrum P(r,n) for each transmission-reception system to calculate detection availability information L(r,n) (Step S2). For example, a constant false alarm rate (CFAR) process is applicable to the peak detection. When the peak is detected at the position of the distance r of the power spectrum P(r,n) of the transmission-reception system having a system number n, L(r,n)=1. When no peak is detected at the same position of the distance r for the transmission-reception system having another system number n', L(r,n')=0.

The signal processing unit 21 calculates a peak detection rate α(r) for each distance r where the peak is detected based on the detection availability information L(r,n). The peak detection rate α(r) is defined using the following equation:

[Formula 1]

$$\alpha(r) = \frac{1}{N}\sum_{n=1}^{N} L(r, n) \quad (1)$$

Here, N denotes the number of the transmission-reception systems. When the antenna apparatus 25 is composed of the two transmission antenna elements Tx and the four reception antenna elements Rx, as illustrated in FIG. 2, N=8.

In the example illustrated in FIG. 5B, since the peaks are detected at the position of the distance r=1.1 m for all the transmission-reception systems, α(1.1)=1. In addition, since the peaks are detected at the position of the distance r=0.85 m for the six transmission-reception systems and no peak is detected at this position for the remaining transmission-reception systems, α(0.85)=6/8.

After calculating the peak detection rate α(r), the signal processing unit 21 determines whether the peak detection rate α(r) exceeds a threshold value (Step S4). If the peak detection rate α(r) exceeds the threshold value, the signal processing unit 21 determines that the peak appearing at the position of the distance r is caused by the target in the coverage area of the main lobe 26 (Step S5). If the peak detection rate α(r) is lower than or equal to the threshold value, the signal processing unit 21 determines that the peak appearing at the position of the distance r is caused by the clutter from the outside of the coverage area of the main lobe 26 (Step S6). The peak based on the reflection from the target in the coverage area of the main lobe is extracted from the multiple peaks detected in Step S2 in the above manner. The processing in Step S4 corresponds to a process to detect the peak commonly appearing in the power spectrum P(r,n) for each transmission-reception system.

Then, the signal processing unit 21 calculates the distance to the target in the coverage area of the main lobe 26 and the azimuth thereof (Step S7). The distance is capable of being calculated from the position of the peak appearing at the intermediate frequency signal IF. The azimuth of the target is capable of being calculated based on the phase difference of the intermediate frequency signal IF between the respective transmission-reception systems and the spacing in the y-axis direction among the multiple reception antenna elements 20 arrayed in the y-axis direction. The antenna apparatus according to the first embodiment functions as a radar apparatus that determines the distance to the target in the coverage area of the main lobe 26 and the azimuth thereof, as described above.

Next, excellent advantages of the first embodiment will be described.

In the first embodiment, the coverage areas of the main lobes 26 of the multiple antenna elements 20 (FIG. 1) are overlapped with each other. Accordingly, the radio waves with high intensity are radiated to the overlapped coverage areas from the multiple transmission antenna elements Tx (FIG. 2). In addition, the radio waves coming from the coverage areas of the main lobes 26 are received by the multiple reception antenna elements Rx with high sensitivity. Consequently, the peaks caused by the target positioned in the coverage areas of the main lobes 26 appear at the intermediate frequency signals IF of all the transmission-reception systems.

In contrast, since the shapes of the side lobes 27 (FIG. 1B) are varied between the antenna elements 20, the peaks caused by the radio waves coming from the outside of the coverage areas of the main lobes 26 do not necessarily appear in all the transmission-reception systems. Accordingly, it is possible to determine whether the peak is caused by the target 31 in the coverage areas of the main lobes 26 or is caused by the clutter based on the ratio of the transmission-reception systems having the peaks. As described above, according to the first embodiment, it is possible to determine the target to be detected with the influence of the clutter and so on being reduced.

For example, the coverage areas of the main lobes 26 are desirably defined as a range −3 dB or more apart from the gain of the peak. In this case, the coverage areas of the main lobes 26 of all the antenna elements may not necessarily completely coincide with each other. For example, it is sufficient for the angle ϕ (FIG. 1B) at which the coverage areas of the main lobes 26 of the antenna elements 20 are overlapped with each other to be 50% or more of the coverage areas of the main lobes 26 of the respective antenna elements 20.

The excellent advantages of the first embodiment will now be described with reference to FIG. 6A and FIG. 6B.

Figure 6A:
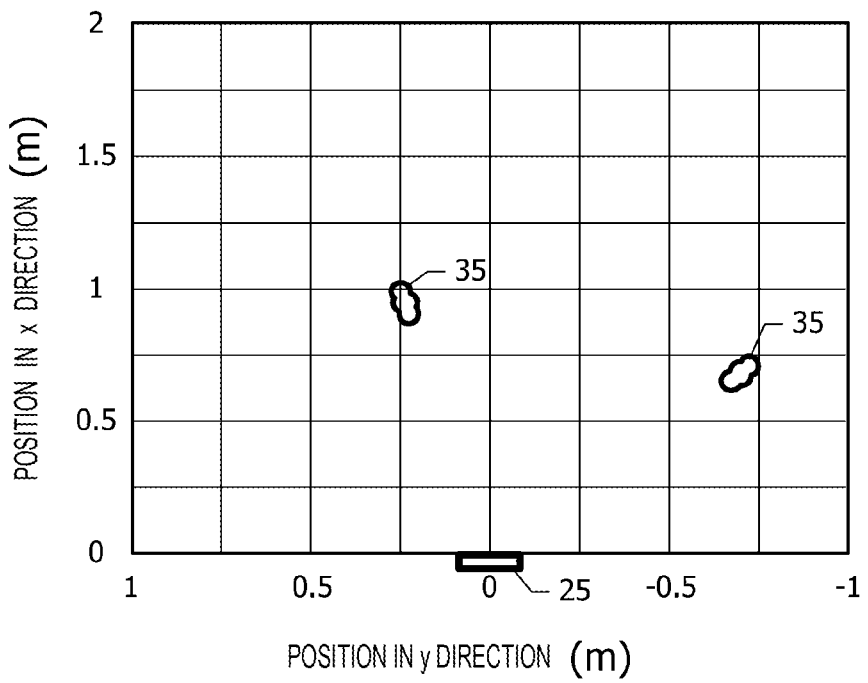
FIG. 6A is a graph illustrating the positions of targets, which are calculated using the antenna apparatus according to the first embodiment

FIG. 6A is a graph illustrating the positions of targets 35, which are calculated using the antenna apparatus 25 according to the first embodiment. The horizontal axis represents the position in the y-axis direction in units of "m" and the vertical axis represents the position in the x-axis direction in units of "m". The origin corresponds to the position of the antenna apparatus 25. The targets 35 are confirmed at the two positions having the same distance from the antenna apparatus and having different azimuth angles with respect to the antenna apparatus.

Figure 6B:
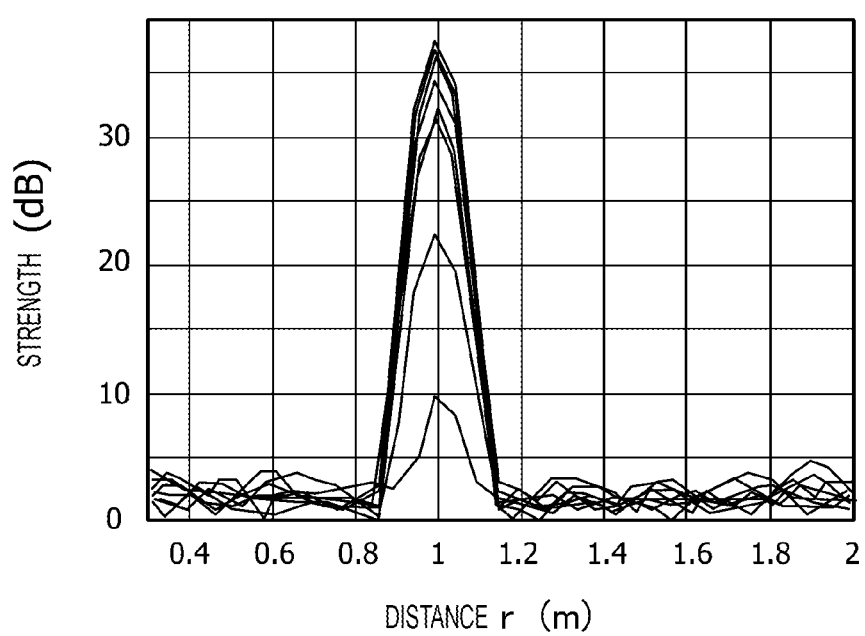
FIG. 6B is a graph indicating the waveform of the power spectrum P(r,n) calculated for each transmission-reception system.

FIG. 6B is a graph indicating the waveforms of the power spectrum P(r,n) calculated for each transmission-reception system. The horizontal axis represents the distance r in units of "m" and the vertical axis represents strength in units of "dB". The peaks appear at the position where the distance r is about 1 m. The strengths of the peaks are greatly varied between the transmission-reception systems. The difference in the strength is caused by the fact that the multiple targets exist at the positions having the same distance and having different azimuth angles.

For example, when a method is adopted in which the peak caused by the target is discriminated from the peak caused by the clutter based on the variation in the peak strength, the peaks varied in strength, illustrated in FIG. 6B, are determined to be the peaks caused by the clutter. Accordingly, when the multiple targets exist at the same distance, false recognition of missing of the targets may occur.

In the first embodiment, the peaks caused by the target are discriminated from the peaks caused by the clutter not based on the variation in the peak strength but based on the peak detection rate α(r). Accordingly, the peaks caused by the target are capable of being detected with high reproducibility also from the power spectrum P(r,n) indicated in FIG. 6B.

Consequently, it is possible to detect the targets even when the multiple targets exist at the same distance.

Next, modifications of the first embodiment will be described.

Although the two transmission antenna elements Tx and the four reception antenna elements Rx are provided in the antenna apparatus in the first embodiment, as illustrated in FIG. 2, the number of the transmission antenna elements Tx and the number of the reception antenna elements Rx may be changed. Alternatively, one transmission antenna element Tx and the multiple reception antenna elements Rx may be provided or the multiple transmission antenna elements Tx and one reception antenna element Rx may be provided. It is sufficient to define the multiple transmission-reception systems.

The antenna apparatus according to the first embodiment may be used as an antenna for data communication. In this case, only the transmission antenna elements Tx may be provided or only the reception antenna elements Rx may be provided in the antenna apparatus. When the antenna apparatus according to the first embodiment is used for data communication, the signals of the radio waves coming from the coverage areas of the main lobes 26 are capable of being preferentially detected, compared with the signals of the radio waves coming from the other directions.

Second Embodiment

Antenna apparatuses according to a second embodiment and modifications of the second embodiment will now be described with reference to the drawings from FIG. 7A to FIG. 10B. Specific configuration examples of the multiple antenna elements 20 (FIG. 1A) in the antenna apparatus according to the first embodiment are described in the second embodiment.

Figure 7A:
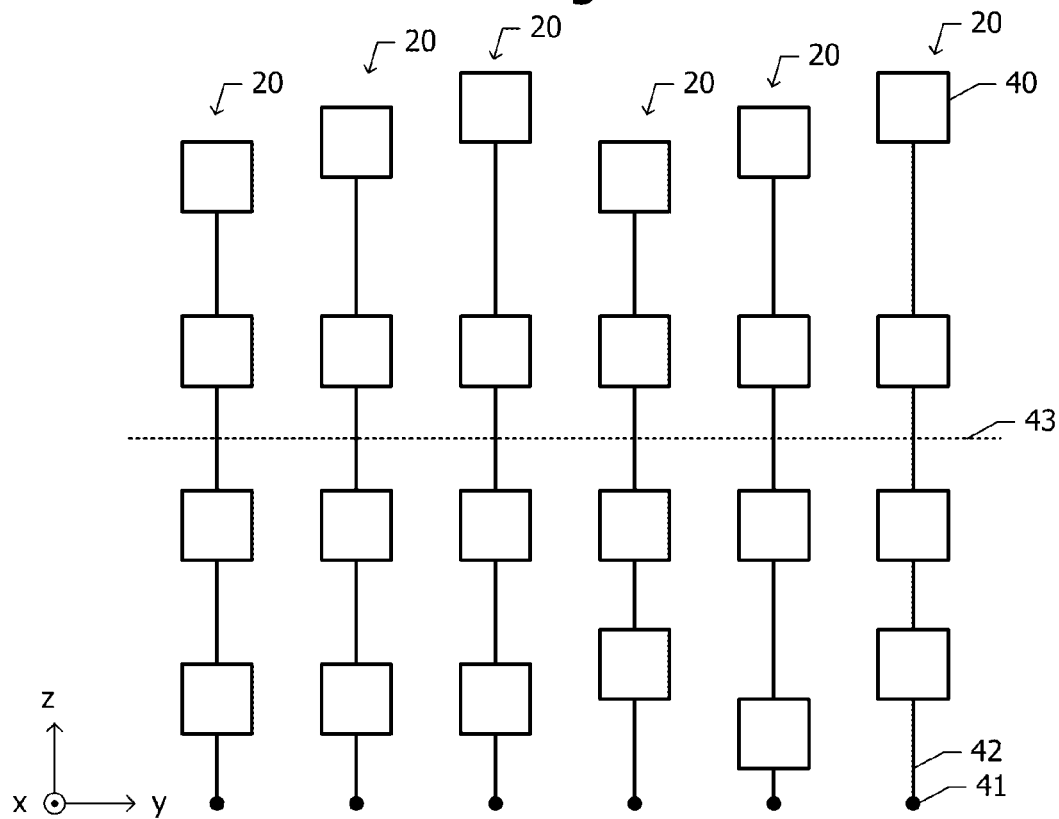
FIG. 7A and FIG. 7B are schematic plan views of the multiple antenna elements 20 in antenna apparatuses according to a second embodiment and according to a first modification of the second embodiment, respectively.

FIG. 7A is a schematic plan view of the multiple antenna elements 20 in the antenna apparatus according to the second embodiment. Each of the multiple antenna elements 20 includes multiple radiation elements 40 arranged along an electric supply line 42 extending in the z-axis direction from an electric supply point 41. The multiple radiation elements 40 resonate at the same frequency and compose a series-fed array. Each of the radiation elements 40 is a patch antenna including conductive patches. The multiple radiation elements 40 included in each of the multiple antenna elements 20 are differently arranged in the multiple antenna elements 20.

For example, the two radiation elements 40 on both sides of a phase center 43 of the series-fed array are placed at the same position in the z-axis direction in all the antenna elements 20 and the positions in the z-axis direction of the other radiation elements 40 are varied between the antenna elements 20. As described above, varying the positions in the z-axis direction of the radiation elements 40 between the antenna elements 20 enables the shapes of the side lobes to be varied between the antenna elements 20.

Figure 7B:
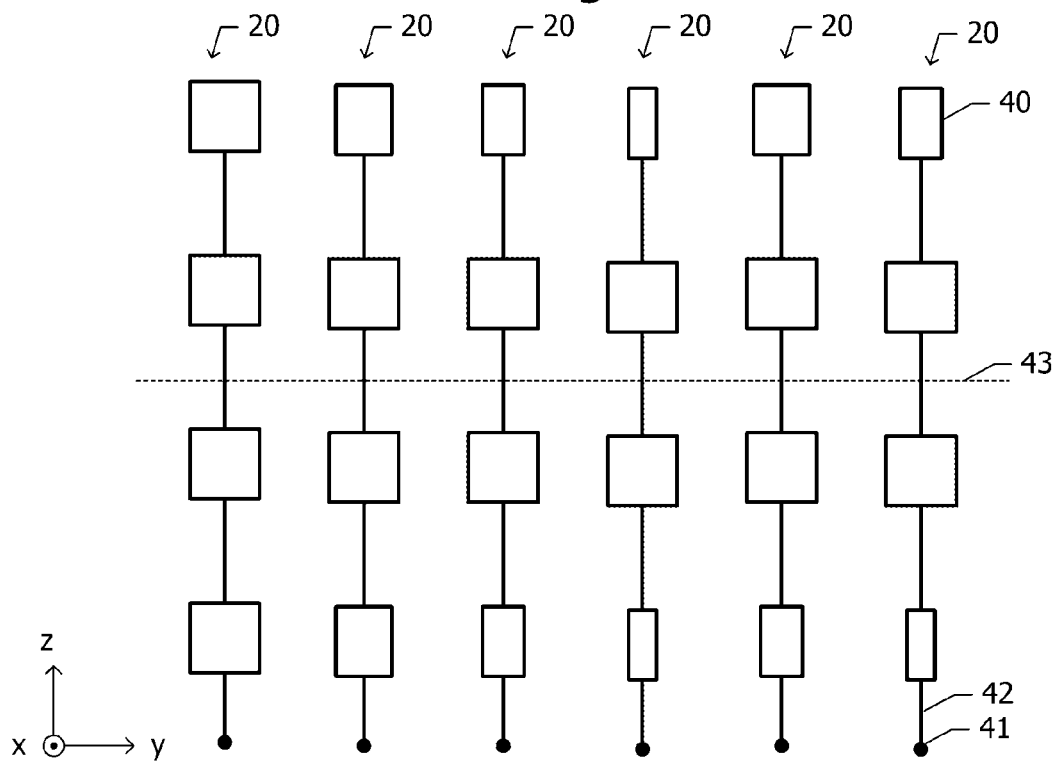

FIG. 7B is a schematic plan view of the multiple antenna elements 20 in the antenna apparatus according to a first modification of the second embodiment. In the first modification, the multiple radiation elements 40 included in each of the multiple antenna elements 20 are varied in dimension and the multiple antenna elements 20 have different aspects of the variation in the dimensions of the multiple radiation elements 40. For example, the respective radiation elements 40 have the same dimension in the z-axis direction and have different dimensions in the y-axis direction. The radiation elements 40 on both sides of the phase center 43 have the same dimensions in all the antenna elements 20 and the other radiation elements 40 have different dimensions in the y-axis direction. Here, having different aspects of the variation means that the dimensions of the radiation elements 40 are varied in distribution among the multiple antenna elements 20 in the z-axis direction.

Varying the aspects of the variation in the dimensions of the radiation elements 40 among the multiple antenna elements 20 enables the shapes of the side lobes to be varied between the antenna elements 20.

FIG. 8 is a schematic plan view of the multiple antenna elements 20 in the antenna apparatus according to a second modification of the second embodiment. In the second modification, the respective multiple antenna elements 20 include different numbers of the radiation elements 40. The spacing between the radiation elements 40 in the z-axis direction is constant. For example, in the antenna elements 20 including the radiation elements 40 of odd numbers, one radiation element 40 is arranged at the position of the phase center 43. Including different numbers of the radiation elements 40 in the multiple antenna elements 20 enables the shapes of the side lobes to be varied between the antenna elements 20.

FIG. 9 is a schematic plan view of the multiple antenna elements 20 in the antenna apparatus according to a third modification of the second embodiment. In the third modification, the arrangement of the multiple radiation elements 40 in the z-axis direction, the sizes of the multiple radiation elements 40, and the number of the radiation elements 40 included in each of the antenna elements 20 are varied among the multiple antenna elements 20. The two radiation elements 40 on both sides of the phase center 43 have the same size and are placed at the same position in the z-axis direction in all the antenna elements 20. Also in the third modification, it is possible to vary the shapes of the side lobes between the antenna elements 20.

Figure 10A:
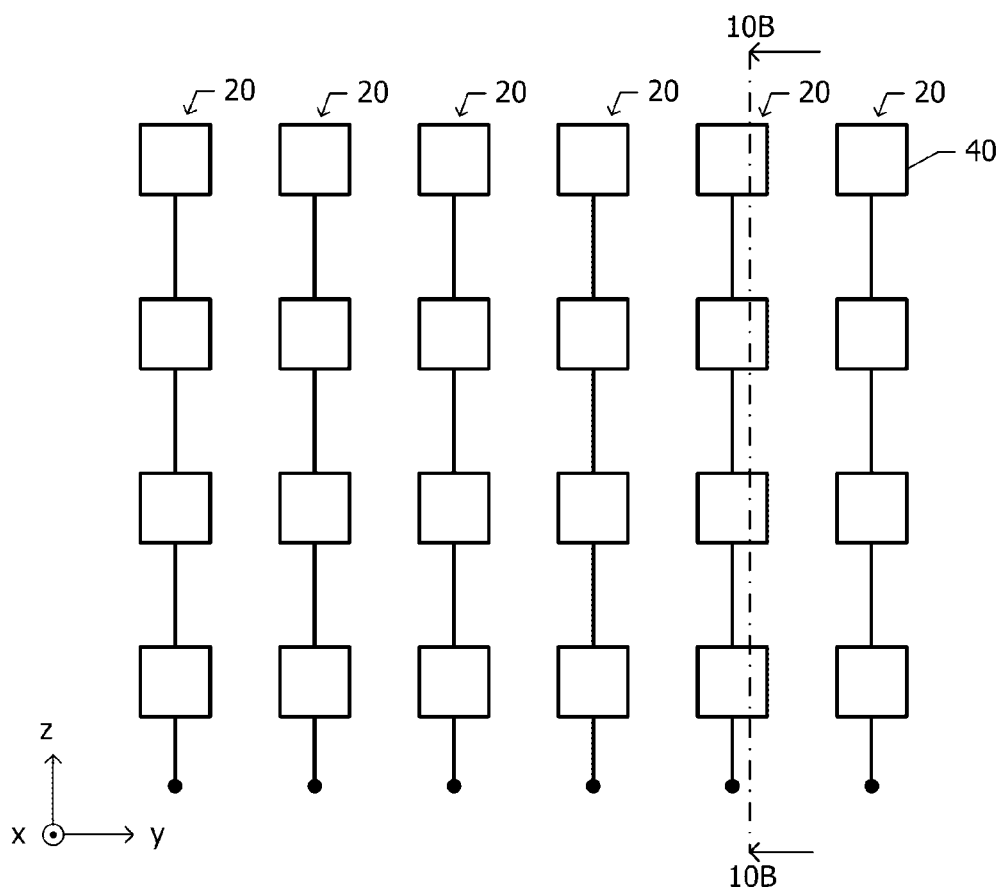
FIG. 10A is a schematic plan view of the multiple antenna elements in an antenna apparatus according to a fourth modification of the second embodiment and FIG. 10B is a cross-sectional view taken along an alternate long and short dash line 10B-10B in FIG. 10A.
Figure 10B:
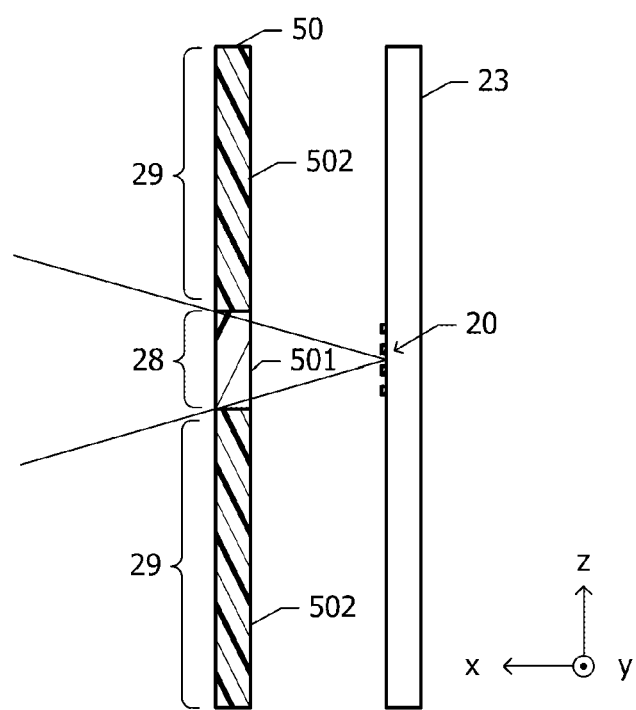

FIG. 10A is a schematic plan view of the multiple antenna elements 20 in the antenna apparatus according to a fourth modification of the second embodiment. FIG. 10B is a cross-sectional view taken along an alternate long and short dash line 10B-10B in FIG. 10A. The radiation elements 40 have the same size and are placed at the same position in the z-axis direction in all the antenna elements 20. The radiation elements 40 of the same number are arranged in all the antenna elements 20.

The multiple antenna elements 20 are arranged on a substrate 23. Each of the multiple antenna elements 20 has a radome 50 arranged at the front side (the positive side of the x axis) of the radiation elements 40. The radome 50 includes a main portion 501 arranged in a coverage area 28 of the main lobe of the radiation pattern of the antenna element 20 and a side portion 502 arranged in an area 29 outside the coverage area 28 of the main lobe.

At least one of the material and the physical structure of the side portion 502 of the radome 50 is varied among the multiple antenna elements 20. The main portions 501 have the same material and the same physical structure in the multiple antenna elements 20.

When the material of the side portion 502 of the radome 50 is varied among the multiple antenna elements 20, the permittivity of the side portion 502 is varied among the multiple antenna elements 20. As a result, the transmittance of the radio waves radiated to the direction of the side lobes and the transmittance of the radio waves coming from the direction of the side lobes are varied among the multiple antenna elements 20. Accordingly, it is possible to vary the shapes of the side lobes between the antenna elements 20.

The physical structure of the side portion 502, which is varied between the antenna elements 20, is exemplified by, for example, the foam size of a foam material, the pore density of a porous material, and the surface roughness (irregularities) of a dielectric body. Varying the physical structure varies the transmittance of the radio waves. As a result, the transmittance of the radio waves to the direction of the side lobes is varied among the multiple antenna elements 20. Accordingly, it is possible to vary the shapes of the side lobes between the antenna elements 20.

The respective embodiments described above are only examples and partial replacement or combination of the components indicated in different embodiments is available. The same effects and advantages of the same components in multiple embodiments are not successively described for the respective embodiments. In addition, the present disclosure is not limited by the embodiments described above. For example, availability of various modifications, improvements, combinations, and so on is obvious to the person skilled in the art.

REFERENCE SIGNS LIST

20 antenna element
21 signal processing unit
22 transmission-reception unit
25 antenna apparatus
26 main lobe
27 side lobe
28 coverage area of main lobe
29 area outside coverage area of main lobe
30 movable body
31 target
32 clutter source
35 target
40 radiation element
41 electric supply point
42 electric supply line
43 phase center
50 radome
221 signal generator
222 mixer
223 A/D converter
501 main portion of radome
502 side portion of radome
Rx reception antenna element
Tx transmission antenna element

The invention claimed is:

1. An antenna apparatus comprising:
   a plurality of antenna elements, each antenna element configured to transmit and/or receive radio waves; and
   a plurality of transmission-reception systems, each transmission reception system comprising at least one of the plurality of antenna elements,
   wherein coverage areas of main lobes of radiation patterns of the plurality of antenna elements overlap each other, and shapes of side lobes of radiation patterns of the plurality of antenna elements are different among the plurality of antenna elements, and
   wherein, with respect to one of the plurality of transmission-reception systems, the antenna apparatus is configured to determine whether a transmission-reception signal transmitted or received by the one of the transmission-reception systems is in a coverage area of the main lobe of the at least one antenna element of the one of the transmission-reception systems.

2. The antenna apparatus according to claim 1, wherein each of the plurality of antenna elements comprises a plurality of radiation elements arrayed in a first direction.

3. The antenna apparatus according to claim 2, wherein the plurality of radiation elements are arranged differently in each of the plurality of antenna elements.

4. The antenna apparatus according to claim 2,
   wherein the plurality of radiation elements comprise a plurality of conductive patches on a substrate and are configured to resonate at the same frequency,
   wherein the plurality of conductive patches of each of the plurality of antenna elements is different in dimension, and wherein the plurality of antenna elements have different aspects of the variation in the dimensions of the corresponding plurality of conductive patches.

5. The antenna apparatus according to claim 2, wherein a number of the plurality of radiation elements of each of the plurality of antenna elements is different among the plurality of antenna elements.

6. The antenna apparatus according to claim 1,
wherein each of the plurality of antenna elements comprises at least one radiation element and a radome, and
wherein, a material of the radome, or a physical structure of a side portion of the radome in an area corresponding to the side lobes of the radiation patterns of the plurality of antenna elements, is different among the plurality of antenna elements.

7. The antenna apparatus according to claim 6, wherein a main portion of the radome in the coverage area of the main lobe of the radiation pattern of the radiation element has the same permittivity in the plurality of antenna elements, and a permittivity of the side portion of the radome is different among the plurality of antenna elements.

8. The antenna apparatus according to claim 6, wherein a main portion of the radome in the coverage area of the main lobe of the radiation pattern of the radiation element has the same surface roughness in the plurality of antenna elements, and a surface roughness of the side portion of the radome is different among the plurality of antenna elements.

9. The antenna apparatus according to claim 1, further comprising:
circuitry configured to process radio-frequency signals that are transmitted and received by the plurality of transmission-reception systems; and
a signal processor configured to:
perform Fourier transforms on signals processed by the circuitry for each of the plurality of transmission-reception systems,
detect peaks of waveforms resulting from the Fourier transform,
extract a peak based on reflection from a target in the coverage area of the main lobe from the detected peaks, and
determine a distance to the target in the coverage area of the main lobe based on the extracted peak.

10. A movable body comprising:
a radar apparatus, the radar apparatus comprising a plurality of transmission-reception systems, each of the plurality of transmission-reception systems comprising a transmission antenna element and a reception antenna element,
wherein coverage areas of main lobes of radiation patterns of the plurality of transmission and reception antenna elements overlap each other, and shapes of side lobes of the plurality of transmission and reception antenna elements are different among the plurality of antenna elements;
circuitry configured to process radio-frequency signals that are transmitted and received by the plurality of transmission-reception systems; and
a signal processor configured to:
perform Fourier transforms on the signals processed by the circuitry for each of the plurality of transmission-reception systems,
detect peaks of waveforms resulting from the Fourier transform,
extract a peak based on reflection from a target in the coverage area of the main lobe from the detected peaks, and
determine a distance to the target in the coverage area of the main lobe based on the extracted peak.

11. A target determination method comprising:
generating an intermediate frequency signal for each of a plurality of transmission-reception systems by processing radio-frequency signals transmitted and received by the plurality of transmission-reception systems, each of the plurality of transmission-reception systems comprising a transmission antenna element and a reception antenna element, wherein coverage areas of main lobes of radiation patterns of the plurality of transmission and reception elements overlap each other, and side lobes of the plurality of transmission and reception elements have different shapes;
performing a Fourier transform on the intermediate frequency signal generated for each transmission-reception system;
detecting peaks of waveforms resulting from the Fourier transforms; and
determining that a peak appearing in the waveforms resulting from the Fourier transform for each transmission-reception system is a peak caused by a target to be detected.

* * * * *